US011099744B2

(12) United States Patent
Zhang

(10) Patent No.: US 11,099,744 B2
(45) Date of Patent: Aug. 24, 2021

(54) METHOD AND DEVICE FOR WRITING STORED DATA INTO STORAGE MEDIUM BASED ON FLASH MEMORY

(71) Applicant: Ant Financial (Hang Zhou) Network Technology Co., Ltd., Hangzhou (CN)

(72) Inventor: Haipeng Zhang, Hangzhou (CN)

(73) Assignee: Ant Financial (Hang Zhou) Network Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/351,904

(22) Filed: Mar. 13, 2019

(65) Prior Publication Data
US 2019/0212922 A1 Jul. 11, 2019

Related U.S. Application Data

(63) Continuation of application No. PCT/CN2017/100570, filed on Sep. 5, 2017.

(30) Foreign Application Priority Data

Sep. 14, 2016 (CN) .......................... 201610827195.6

(51) Int. Cl.
*G06F 12/00* (2006.01)
*G06F 3/06* (2006.01)

(52) U.S. Cl.
CPC .......... *G06F 3/0616* (2013.01); *G06F 3/0647* (2013.01); *G06F 3/0652* (2013.01); *G06F 3/0655* (2013.01); *G06F 3/0679* (2013.01)

(58) Field of Classification Search
CPC ............. G06F 12/0246; G06F 13/1657; G06F 11/1076; G06F 11/3442; G06F 16/122
See application file for complete search history.

(56) References Cited

U.S. PATENT DOCUMENTS 7,096,313 B1 8/2006 Chang et al.
7,411,757 B2 8/2008 Chu et al.
(Continued)

FOREIGN PATENT DOCUMENTS

CN 101046771 A 10/2007
CN 101364437 A 2/2009
(Continued)

OTHER PUBLICATIONS

Written Opinion of the International Searching Authority and International Search Report for PCT Application No. PCT/CN2017/100570 dated Dec. 6, 2017 (17 pages).
(Continued)

*Primary Examiner* — Ryan Bertram
*Assistant Examiner* — Trang K Ta

(57) ABSTRACT

Methods, systems, and apparatus, including computer programs encoded on computer storage media, for writing data in one or more storage units. One of the methods includes obtaining an erasing count for each of multiple storage units, wherein the erasing count equals a total count of erasing operations that have been performed on all blocks of the storage unit. The method further includes identifying one or more of the storage units that satisfy one or more conditions associated with writing data, determining a storage unit that has the smallest erasing count among the identified storage units, and writing the data in the determined storage unit.

18 Claims, 3 Drawing Sheets

(56) References Cited

U.S. PATENT DOCUMENTS

| | | |
|---|---|---|
| 7,701,700 B2 | 4/2010 | Hall et al. |
| 7,925,830 B2 | 4/2011 | Yagisawa et al. |
| 8,010,738 B1 | 8/2011 | Chilton et al. |
| 8,024,442 B1 | 9/2011 | Roussos et al. |
| 8,069,301 B2 | 11/2011 | Fukutomi et al. |
| 8,427,552 B2 | 4/2013 | Marman et al. |
| 8,464,106 B2 | 6/2013 | Filor et al. |
| 8,700,842 B2 | 4/2014 | Dinker |
| 8,775,720 B1 | 7/2014 | Meyer et al. |
| 8,782,661 B2 | 7/2014 | Ulrich et al. |
| 8,825,977 B1 | 9/2014 | Syu et al. |
| 8,959,280 B2 | 2/2015 | Yu et al. |
| 9,123,422 B2 | 9/2015 | Yu et al. |
| 9,389,938 B2 | 7/2016 | Melik-Martirosian |
| 9,405,676 B2 | 8/2016 | Jeddeloh |
| 9,727,455 B2 | 8/2017 | Sutardja |
| 9,776,673 B2 | 10/2017 | Hu et al. |
| 10,157,002 B2 | 12/2018 | Grube et al. |
| 2005/0055495 A1 | 3/2005 | Vihmalo et al. |
| 2007/0233931 A1 | 10/2007 | Tanaka et al. |
| 2008/0140918 A1 | 6/2008 | Sutardja |
| 2008/0276038 A1 | 11/2008 | Tanaka et al. |
| 2009/0168525 A1* | 7/2009 | Olbrich .............. G06F 13/1657 365/185.11 |
| 2010/0115178 A1* | 5/2010 | Sauber ................ G06F 12/0246 711/103 |
| 2010/0250700 A1 | 9/2010 | O'brien et al. |
| 2011/0016287 A1 | 1/2011 | Acedo et al. |
| 2011/0066882 A1 | 3/2011 | Walls et al. |
| 2011/0246705 A1* | 10/2011 | Mudama ............ G11C 16/3495 711/103 |
| 2013/0179631 A1 | 7/2013 | Cepulis |
| 2014/0089565 A1 | 3/2014 | Lee et al. |
| 2014/0108713 A1 | 4/2014 | Yamamoto et al. |
| 2014/0208046 A1 | 7/2014 | Baryudin et al. |
| 2014/0215129 A1 | 7/2014 | Kuzmin et al. |
| 2014/0223082 A1 | 8/2014 | Charbouillot et al. |
| 2015/0012691 A1 | 1/2015 | Yamaguchi |
| 2015/0032944 A1 | 1/2015 | Chu |
| 2015/0095546 A1* | 4/2015 | Bennett .............. G06F 12/0246 711/5 |
| 2015/0113203 A1 | 4/2015 | Dancho et al. |
| 2015/0143021 A1 | 5/2015 | Bruso et al. |
| 2015/0178191 A1 | 6/2015 | Camp et al. |
| 2015/0277787 A1 | 10/2015 | Takubo et al. |
| 2016/0062676 A1 | 3/2016 | Campbell et al. |
| 2016/0170663 A1 | 6/2016 | Masumoto et al. |
| 2017/0010961 A1* | 1/2017 | Tan .................... G06F 12/0246 |
| 2017/0147504 A1* | 5/2017 | Chang ................. G06F 12/109 |
| 2017/0199769 A1* | 7/2017 | Jain .................... G06F 11/3442 |
| 2018/0011642 A1* | 1/2018 | Koseki ................ G06F 11/1076 |
| 2020/0019313 A1* | 1/2020 | Chen ................... G06F 16/122 |
| 2020/0150868 A1* | 5/2020 | Byun .................... G06F 3/061 |

FOREIGN PATENT DOCUMENTS

| | | |
|---|---|---|
| CN | 101419842 A | 4/2009 |
| CN | 101441599 A | 5/2009 |
| CN | 102135942 A | 7/2011 |
| CN | 101441599 B | 11/2011 |
| CN | 102880556 A | 1/2013 |
| CN | 102981970 A | 3/2013 |
| CN | 103116549 A | 5/2013 |
| CN | 104360957 A | 2/2015 |
| CN | 104731515 A | 6/2015 |
| CN | 105159601 A | 12/2015 |
| EP | 1840722 A2 | 10/2007 |
| JP | 2007-265265 A | 10/2007 |
| JP | 2010-512569 A | 4/2010 |
| JP | 2012-522321 A | 9/2012 |
| JP | 2015-014963 A | 1/2015 |
| RU | 2014101458 A | 7/2015 |
| WO | 2008/073421 A2 | 6/2008 |
| WO | 2011/021126 A1 | 2/2011 |

OTHER PUBLICATIONS

International Preliminary Report on Patentability Chapter I for PCT Application No. PCT/CN2017/100570 dated Mar. 28, 2019 (14 pages).
Non-Final Rejection and Search Report for Taiwanese Application No. 106124168 dated Nov. 27, 2018 (6 pages).
Non-Final Rejection and Search Report for Taiwanese Application No. 106124168 dated Mar. 20, 2019 (6 pages).
First Office Action for Chinese Application No. 201610827195.6 dated May 7, 2019 with English machine translation (17 pages).
First Search for Chinese Application No. 201610827195.6 dated Apr. 24, 2019 (1 page).
Office Action and Search Report for Russian Application No. 2019110993 dated Jan. 28, 2020.
Examination Report No. 1 for Australian Application No. 2017325886 dated Jan. 23, 2020.
Search Report for European Application No. 17850208.4 dated Apr. 3, 2020.
Office Action for Canadian Application No. 3036415 dated Apr. 6, 2020.
Examination Report No. 2 for Australian Application No. 2017325886 dated Aug. 24, 2020.
Examination Report for Canadian Application No. 3036415 dated Sep. 2, 2020.
Office Action for Japanese Application No. 2019-514207 dated Aug. 4, 2020.

* cited by examiner

METHOD AND DEVICE FOR WRITING STORED DATA INTO STORAGE MEDIUM BASED ON FLASH MEMORY

CROSS-REFERENCE TO RELATED APPLICATIONS

This application is a continuation application of International Application No. PCT/CN2017/100570, filed on Sep. 5, 2017, which is based on and claims priority to and benefits of Chinese Patent Application No. 201610827195.6 filed with the State Intellectual Property Office (SIPO) of the People's Republic of China on Sep. 14, 2016. The entire contents of the above-identified applications are incorporated herein by reference.

TECHNICAL FIELD

This application relates to the field of computer and network technologies, and in particular, to a method and a device for writing data into a flash memory-based storage medium.

BACKGROUND

SSDs (Solid State Drives) that use a flash memory as the storage medium and adopt electronic read/write have superior read/write performance and have become mainstream hardware of storage for personal computers and servers. The storage medium of SSD is a NAND Flash cell, each bit of which has a physical characteristic that the value of the bit can be changed from 1 to 0 by charging the transistor, while its value can be reset from 0 to 1 only through erasing. The erasing operation is carried out in a unit of block.

The life of a NAND Flash cell is measured by a number of erasing and writing on the cell. When a block reaches this number of erasing and writing, it is impossible to use the block for storing data, and the block becomes a bad block. As the number of bad blocks increases, the service life of SSD decreases sharply.

Therefore, an FTL (Flash Translation Level) balanced erasing and writing algorithm or a file system layer having balanced erasing and writing functions is used in current technologies to achieve, as much as possible, balanced erasing and writing for all blocks on the same SSD so as to extend the service life of an individual SSD. Examples include the FTL layer dynamic balancing strategy, the FTL layer static balancing strategy, JAFF2 (Journaling Flash File System Version 2), YAFFS (Yet Another Flash File System), and the like.

For a system having a plurality of SSDs available, however, one or more SSDs could often be subjected to too many times of erasing and writing that are far more than those on one or more other SSDs. As a result, the overly used SSD is damaged prematurely. If no high availability solution is applied to data stored on the SSD, it is possible to result in data loss; for a system that adopts a high availability storage solution, the system stability would be weakened due to additional data migration.

SUMMARY

According to one aspect, the specification provides a method for writing data into a flash memory-based storage medium. The method can be applied to a central controller for performing writing control over at least two physical storage units. According to one aspect, the method comprises: obtaining a total cumulative erasing count of all blocks in each of the physical storage units; and writing the data into at least one physical storage unit having the lowest total cumulative erasing count among physical storage units satisfying a preset writing condition.

According to another aspect, the specification further provides a device for writing data into a flash memory-based storage medium. The device can be applied to a central controller for performing writing control over at least two physical storage units. According to another aspect, the device comprises: a total-cumulative-erasing-count member configured to obtain a total cumulative erasing count of all blocks in each of the physical storage units; and a physical-storage-unit member configured to write the data into at least one physical storage unit having the lowest total cumulative erasing count among physical storage units satisfying a preset writing condition.

According to another aspect, the specification provides a method for writing data in at least one of a plurality of storage units, comprising: obtaining an erasing count for each of the storage units, wherein the erasing count equals a total count of erasing operations that have been performed on all blocks of the storage unit; identifying one or more of the storage units that satisfy one or more conditions associated with writing the data; determining a storage unit that has the smallest erasing count among the identified storage units; and writing the data in the determined storage unit.

In some embodiments, the method further comprises determining that a difference between a first erasing count of a first one of the plurality of storage units and a second erasing count of a second one of the plurality of storage units exceeds a threshold value, wherein the first erasing count is greater than the second erasing count and migrating data from the first storage unit to the second storage unit.

In other embodiments, the threshold value is determined based on an average of the erasing counts of all of the physical storage units.

In other embodiments, the data comprises data to be written for file migration or file storage.

In yet other embodiments, the plurality of storage units comprise a cluster of host machines and the obtaining an erasing count for each of the physical storage units comprises receiving an erasing count reported by each of the host machine.

In yet other embodiments, each of the physical storage units comprises a hard drive in a host machine and the obtaining an erasing count for each of the physical storage units comprises reading an erasing count maintained in a superblock of each hard drive.

In still other embodiments, the erasing count maintained in the superblock of each hard drive is incremented by 1 each time a block of the hard drive is allocated for an erasing operation.

According to yet another aspect, the specification provides a system for writing data in at least one of a plurality of storage units, comprising a processor and a non-transitory computer-readable storage medium storing instructions executable by the processor to cause the system to perform operations comprising: obtaining an erasing count for each of the storage units, wherein the erasing count equals a total count of erasing operations that have been performed on all blocks of the storage unit; identifying one or more of the storage units that satisfy one or more conditions associated with writing the data; determining a storage unit that has the smallest erasing count among the identified storage units; and writing the data in the determined storage unit.

According to still another aspect, the specification provides a non-transitory computer-readable storage medium for writing data in at least one of a plurality of storage units, configured with instructions executable by one or more processors to cause the one or more processors to perform operations comprising: obtaining an erasing count for each of the storage units, wherein the erasing count equals a total count of erasing operations that have been performed on all blocks of the storage unit; identifying one or more of the storage units that satisfy one or more conditions associated with writing the data; determining a storage unit that has the smallest erasing count among the identified storage units; and writing the data in the determined storage unit.

It can be seen from the above technical solution that in the embodiments of the specification, the central controller selects, based on a total cumulative erasing count of all blocks in each physical storage unit, a physical storage unit having the lowest total cumulative erasing count from physical storage units satisfying a preset writing condition for writing of data, thereby achieving balanced erasing and writing among different physical storage units, avoiding premature damage to a single physical storage unit due to too many times of erasing and writing on the physical storage unit, lowering the possibility of data loss in a non-high availability scenario, and improving the stability of a system in which the physical storage unit is located in a high availability scenario.

DETAILED DESCRIPTION

The embodiments of the specification provide a novel method for writing data into a flash memory-based storage medium, the method comprising: selecting, based on statistical data of a total cumulative erasing count of all blocks in each physical storage unit, one or more physical storage units having the lowest total cumulative erasing count from physical storage units satisfying a preset writing condition for writing of data, thereby achieving balanced erasing and writing among different physical storage units so that the service lives of different physical storage units are closer to each other, which lowers the possibility of data loss as a result of premature damage to a single physical storage unit or the possibility of impact on the system stability.

In the embodiments of the specification, two or more physical storage units are controlled by a central controller for write control, namely, the central controller decides which physical storage unit(s) to write data on. Here, a physical storage unit is an entity that is physically independent from other physical storage units and uses a flash memory-based storage medium. It can be an independent flash memory-based physical storage component (e.g., a Flash chip, a hard drive, and the like), a host machine comprising at least one independent flash memory-based physical storage component (e.g., a disk array cabinet, a personal computer, a server), and the like; the central controller is implemented by software or by a combination of software and hardware, can run on a physical storage unit, or can run on another host machine that is independent from all physical storage units controlled by the central controller.

Figure 1:
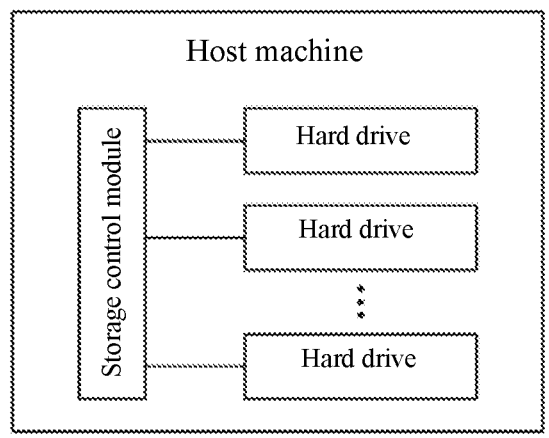
FIG. 1 is a schematic structural diagram of the composition of a host machine in a first application example according to some embodiments.

FIG. 1 illustrates an example of an application scenario according to some embodiments, wherein a host machine is installed with a number of hard drives (the physical storage units in this scenario), and a storage controller (the central controller in this scenario) runs on the host machine for performing read/write control on all hard drives, including determination of storing what data on which hard drive.

Figure 2:
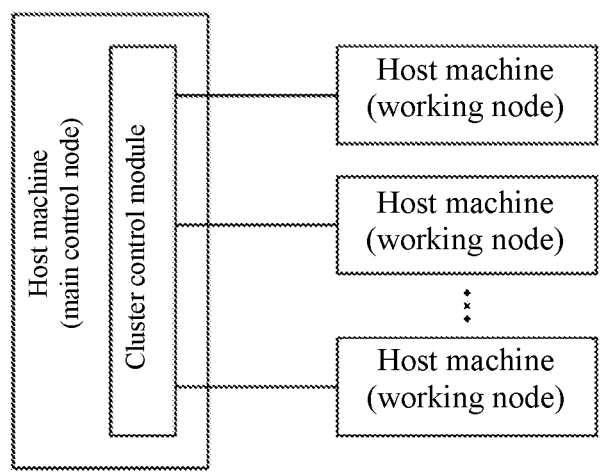
FIG. 2 is a schematic structural diagram of the composition of a cluster in a second application example according to some embodiments.

FIG. 2 illustrates another example of an application scenario according to some embodiments, wherein one host machine in a cluster formed by a plurality of host machines (the physical storage units in this scenario) is a main control node, while other host machines are working nodes. The cluster controller (the central controller in this scenario) of the cluster runs on the main control node to perform allocation and management on data storage for the number of host machines. When a fault occurs to the host machine functioning as the main control node, another host machine can be upgraded to the main control node to continue the operations of the cluster.

The central controller according to some embodiments can run on any device capable of computation and storage, for example, a tablet computer, a PC (Personal Computer), a laptop computer, and a server.

Figure 3:
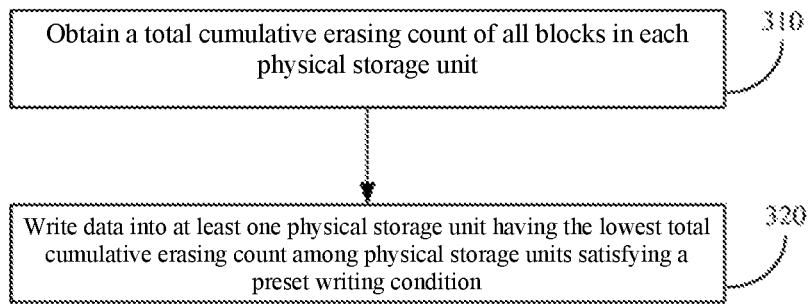
FIG. 3 is a flow chart of a method for writing data according to some embodiments.

In some embodiments (e.g., Embodiment I), a process of a method for writing data is shown in FIG. 3.

Step 310, obtaining a total cumulative erasing count of all blocks in each physical storage unit.

Block is the smallest unit of storage space allocation in data storage. When a block is allocated, an erasing operation will be performed on the block, so that an application (or thread, process, and the like) obtaining the space of the block can use the block for writing data. Therefore, the count that a block is allocated is a cumulative count that the block is erased, which may be referred to as a cumulative erasing count for the block. The total cumulative erasing count of a physical storage unit may be obtained by summing the cumulative erasing counts of all the blocks in the physical storage unit. Such a total cumulative erasing count of the physical storage unit, which equals to a total count of erasing operations that have been performed on all blocks of the physical storage unit, may alternatively be referred to as a erasing count for the physical storage unit.

For a physically independent storage component (e.g., a hard drive, a flash chip, and the like), block division is typically performed when the storage component is initialized. With a hard drive as an example, in most file systems, an administrator can designate the size of a block when initializing the hard drive. Assuming that a storage controller of the host machine where the hard drive is located performs storage management on the hard drive, the storage controller can use a unique block identifier to represent each block on the hard drive among all blocks on the hard drive, and maintain a correspondence relationship between each block identifier of the hard drive and a cumulative erasing count. The cumulative erasing count of the block identifier of a block is incremented by 1 each time when the block is allocated; when the hard drive functions as the physical storage unit in the application scenario, the cumulative erasing counts of all the blocks can be added to obtain the total cumulative count of the hard drive. Alternatively, the storage controller can also maintain the total cumulative erasing count of all the blocks in a superblock of the hard drive. The total cumulative erasing count is incremented by the number of blocks allocated each time when blocks are allocated; in other words, the total cumulative erasing count is incremented by 1 each time when a block is allocated. In the manner described above, the total cumulative erasing count of all blocks of a physically independent storage component can be obtained.

In the case where the physical storage unit is a host machine comprising at least one independent physical storage component, the storage controller on each host machine can count the total cumulative erasing count of the physical storage component controlled by the storage controller and report the total cumulative erasing count to a central controller. An example of report manners can be determined according to the implementation of an application scenario. For example, assuming that all host machines form a cluster, a cluster controller of the cluster is the central controller in the application scenario. Each host machine can proactively report the total cumulative erasing count of all blocks on the host machine to the cluster controller at a preset period; alternatively, the cluster controller can poll all host machines at a preset period for the total cumulative erasing count of all blocks, and then the cluster controller can receive the total cumulative erasing count of all blocks on each host machine at the preset period.

Step 320, writing data into at least one physical storage unit having the lowest total cumulative erasing count among physical storage units satisfying a preset writing condition.

Assuming that the data needs to be written into N (N being a natural number) physical storage units, one or more conditions may be used to determine in which physical storage unit(s) to write the data when there are two or more physical storage units that can be used for writing the data. For example, the conditions to be satisfied typically include that a remaining storage space is sufficient to accommodate the data to be written. In some embodiments, a preset writing condition can be generated according to acceptable ranges of one or more of the above condition(s), which will be described below with two examples:

In the first example, among a plurality of hard drives, N hard drives having the biggest remaining storage space are used as hard drives for writing data. Then in some embodiments, a preset writing condition can be that the remaining storage space is not smaller than a preset value or not lower than a preset percent of the hard drive capacity.

In the second example, among a number of host machines, N host machines having a remaining storage space that is sufficient to accommodate data to be written and having the lowest number of accesses to the data already stored on the host machines are selected. Then in some embodiments, preset writing conditions can be that the remaining storage space is sufficient to accommodate the data to be written and that the number of accesses to the data already stored on a host machine does not exceed a threshold.

The data to be written into a physical storage unit can be data to be written when saving a file or can be data to be written when migrating a file. For a central controller, data to be written when saving a file is typically newly added data, while data to be written when migrating a file means maintenance of data that has already been saved. As an example, there may be one copy of data to be written when saving a file, or may be two or more copies of data to be written when saving a file, in which case each copy may be written into a different physical storage unit. File migration includes two cases. In one case, a physical storage unit that stores a file is replaced, i.e., the stored file is written into a new physical storage unit and deleted from the physical storage unit that originally stores the file; in another case where the application scenario stores more than two copies of files, when one of the files is damaged or the physical storage unit on which one of the files is located breaks down, a copy of the file may be made to a physical storage unit that functions normally to meet the requirement of high availability of the entire system. During file migration, a preset writing condition can be used to exclude physical storage units that have already stored a copy of the file and/or physical storage units that break down.

Therefore, it is possible that more than one physical storage unit is needed for the writing of data for either file storage or file migration. After obtaining a total cumulative erasing count of all blocks for each physical storage unit, therefore, the central controller determines, according to a preset writing condition, a number of physical storage units available for selection when there is a need for a writing operation on data, and selects, from the physical storage units, N (N being a natural number) physical storage units having the lowest total cumulative erasing counts for the writing of data. As such, balanced erasing and writing can be achieved among different physical storage units.

In some embodiments, in addition to performing balanced erasing and writing among the physical storage units when writing data, the central controller can also proactively perform file migration when there is a significant difference in erasing and writing among the physical storage units, so as to balance the use of the physical storage units. For example, the central controller can monitor the erasing and writing of each physical storage unit. When a difference between total cumulative erasing counts of two physical storage units exceeds a preset deviation range, the data is migrated from one of the two physical storage units that has a higher total cumulative erasing count to the physical storage unit having a lower total cumulative erasing count. Here, the preset deviation range may be used as a threshold value for the difference between the total cumulative erasing counts of the two physical storage units.

As an example, the preset deviation range (which may be used as a threshold value) can be determined according to factors like the size of a file for storage and requirements for balanced erasing and writing. In an application scenario, the preset deviation range can be determined based on an average of total cumulative erasing counts of all physical storage units. For example, 20% of the average can be used as the preset deviation range.

Therefore, in Embodiment I, the central controller selects, based on the statistical data of total cumulative erasing count of all blocks in each physical storage unit, a physical storage unit having the lowest total cumulative erasing count from physical storage units satisfying a preset writing condition for writing of data, thereby achieving balanced erasing and writing among different physical storage units and avoiding premature damage to a single physical storage unit due to too many times of erasing and writing on the physical storage unit, so that the service lives of different physical storage units are closer to each other, which can lower the possibility of data loss in a non-high availability scenario, and improve the stability of a system where the physical storage unit is located in a high availability scenario.

If at least some host machines have more than two hard drives or other independent physical storage components in a cluster consisted of a number of host machines, particular embodiments can be applied on the cluster level and the host machine level, respectively. Namely, balanced erasing and writing among different host machines is achieved on the cluster level, and balanced erasing and writing among different hard drives or other physical storage components on a single host machine is achieved on the host machine level. In addition, the FTL balanced erasing and writing algorithm or a file system layer having balanced erasing and writing functions can be used on a single host machine or other physical storage components to achieve balanced erasing and writing on the level of physical storage components, thereby achieving balanced erasing and writing on all levels of the entire cluster system, extending the service life of storage devices in the cluster system, and also improving the stability of the cluster system.

Figure 4:
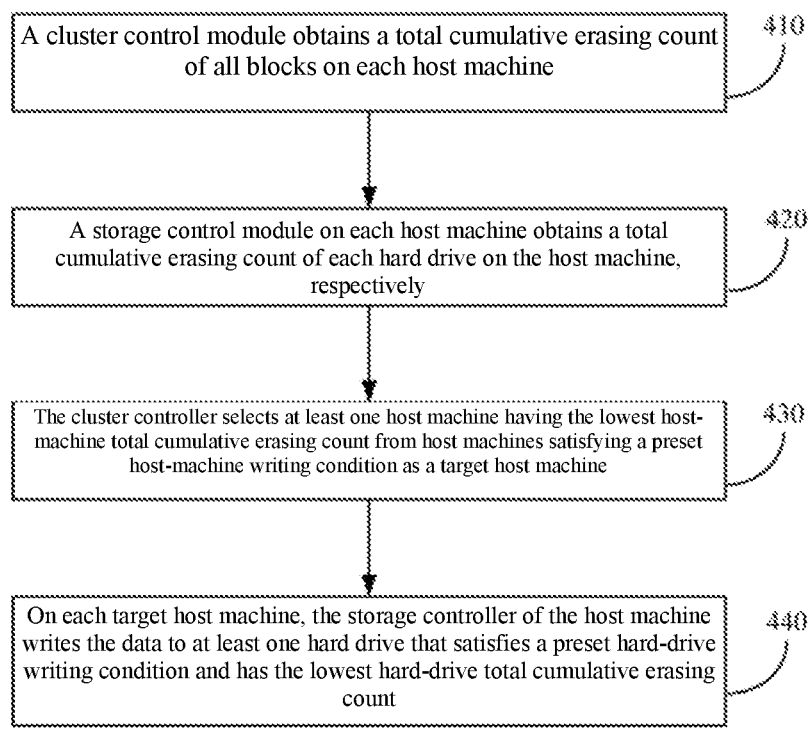
FIG. 4 is a flow chart of a method for writing data in a cluster according to some embodiments.

In some embodiments (e.g., Embodiment II), a flow chart of a method for writing data in a cluster is shown in FIG. 4. The cluster in this embodiment comprises at least two host machines, and the host machines are subject to storage management by a cluster controller; each host machine comprises at least two hard drives using flash memory as the storage medium, and a storage controller on each host machine performs storage management on the hard drives of the host machine. Embodiment II provides an example for simultaneous application of Embodiment I on two levels (the cluster level and the host machine level), and the description in Embodiment I can be referred to for a detailed description of all steps, which will not be repeated.

Step 410, a cluster controller obtains a total cumulative erasing count of all blocks on each host machine.

Step 420, a storage controller of each host machine obtains a total cumulative erasing count of each hard drive on the host machine, respectively.

Step 430, the cluster controller selects at least one host machine having the lowest host-machine total cumulative erasing count from host machines satisfying a preset host-machine writing condition as a target host machine.

When the cluster has data to be written, for example, data to be written during file migration and/or file storage, assuming that the data needs to be written to N host machines, the cluster controller selects at least N host machines having the lowest host-machine total cumulative erasing count from host machines satisfying a preset host-machine writing condition as target host machines, i.e., host machines to be written with the data needs to be written.

Step 440, on each target host machine, the storage controller of the host machine writes the data to at least one hard drive that satisfies a preset hard-drive writing condition and has the lowest hard-drive total cumulative erasing count.

When a host machine is selected as a target host machine, assuming that the data needs to be written to M (M being a natural number) hard drives on the host machine, the storage controller of the host machine selects M hard drives having the lowest hard-drive total cumulative erasing count from hard drives satisfying a preset hard-drive writing condition as target hard drives, and writes the data into the target hard drives.

The cluster controller can monitor differences between total cumulative erasing counts of the host machines. When the difference between total cumulative erasing counts of two host machines exceeds a preset host-machine deviation range (which may be used as a threshold value), the cluster controller migrates the data from one of the two host machines that has a higher total cumulative erasing count to the host machine having a lower total cumulative erasing count. With regard to the host machine to be written with the migrated data, the storage controller of the host machine can write the data to a hard drive that satisfies a preset hard-drive writing condition and has the lowest hard-drive total cumulative erasing count.

The storage controller of each host machine can monitor differences between total cumulative erasing counts of hard drives on the host machine. When the difference between total cumulative erasing counts of two hard drives on a host machine exceeds a preset hard-drive deviation range (which may be used as a threshold value), the storage controller of the host machine can migrate the data from one of the two hard drives that has a higher total cumulative erasing count to the hard drive having a lower total cumulative erasing count.

Therefore, by applying the method in Embodiment I on the cluster level (between the host machines) and the host machine level (between hard drives on each host machine), respectively, Embodiment II achieves balanced erasing and writing for all physical storage components in the entire cluster system, extends the service life of storage devices in the cluster system, and also improves the stability of the cluster system.

In an example, a high availability cluster system comprises K (K being a natural number greater than 3) host machines, each host machine comprising at least 3 hard drives using flash memory as the storage medium. One copy of each file stored in the cluster should be stored on 3 different host machines, respectively. A cluster controller of the cluster runs on a main control node (one of the host machines) of the cluster and is used to control which 3 host machines to store a file; a storage controller runs on each host machine and is used to control which hard drive to store the file.

On each host machine, the storage controller maintains, in a superblock of each hard drive, a cumulative erasing count block_wear_count for each block of the hard drive and a total cumulative erasing count disk_wear_count for all blocks of the hard drive. When a block on the hard drive is allocated, the cumulative erasing count block_wear_count corresponding to the block identifier block_num of the block is incremented by 1, and the total cumulative erasing count disk_wear_count for all blocks of the hard drive is incremented by 1.

In addition, the storage controller maintains a total cumulative erasing count server_wear_count for all blocks of the host machine, and server_wear_count equals to the sum of disk_wear_count of all hard drives on the host machine. Each working node in the cluster must periodically send a heartbeat signal to the main control node, and server_wear_count of the host machine where a working node is located can be reported to the cluster controller in the periodic heartbeat signal. The storage controller on the main control node can also report server_wear_count of the host machine where the main control node is located to the cluster controller at a period that is the same as that of heartbeat signals.

When a new file is written into the cluster, the cluster controller determines a number of host machines satisfying a preset host-machine writing condition from the K host machines. The preset host-machine writing condition for writing a new file in this example is that the remaining storage capacity exceeds 15% of the total storage capacity of a host machine and the number of accesses to the data does not exceed a set threshold. Among the host machines satisfying the preset host-machine writing condition for writing a new file, the cluster controller selects 3 host machines having the lowest values of server_wear_count as host machines for writing a new file.

On the selected 3 host machines, a storage controller of each host machine determines a number of hard drives satisfying a preset hard-drive writing condition from the hard drives of the host machine. The preset hard-drive writing condition in this example is that the remaining storage capacity exceeds 10% of the total storage capacity of a hard drive. Among the hard drives satisfying the hard-drive writing condition, the storage controller selects a hard drive having the lowest disk_wear_count for writing a new file.

When a host machine or a hard drive on a host machine in the cluster breaks down, the cluster controller regards files stored on the host machine or the hard drive no longer useable. As a result, the stored copies of these files in the cluster are fewer than 3 copies. Assuming that a preset host-machine writing condition for migrating a file is that the remaining storage capacity exceeds 15% of the total storage capacity of a host machine, the number of accesses to the data does not exceed a set threshold, and the file to be written has not been stored, then the cluster controller selects, from the host machines satisfying the preset host-machine writing condition for migrating a file, host machines having the lowest server_wear_count as host machines for writing the migrated files. On the selected host machines, the storage controller selects, from the hard drives satisfying the hard-drive writing condition, a hard drive having the lowest disk_wear_count for writing the migrated file.

The cluster controller monitors a difference between total cumulative erasing counts server_wear_count of the host machines at a certain host machine monitoring period. If the difference between the maximum value and the minimum value of server_wear_count in the cluster exceeds 20% of an average of all server_wear_count, files on the host machine having the maximal server_wear_count are migrated to the host machine having the minimal server_wear_count, until the difference between the maximum value and the minimum value of server_wear_count in the cluster is within 20% of the average of all server_wear_count. Selection of migration files can be implemented, which will not be repeated.

On each host machine, the storage controller monitors a difference between total cumulative erasing counts disk_wear_count of the hard drives on the host machine at a certain hard drive monitoring period. If the difference between the maximum value and the minimum value of disk_wear_count on the host machine exceeds 15% of an average of all disk_wear_count, files on the hard drive having the maximal disk_wear_count are migrated to the hard drive having the minimal disk_wear_count, until the difference between the maximum value and the minimum value of disk_wear_count on the host machine is within 15% of the average of all disk_wear_count. Selection of migration files can similarly be implemented.

Figure 5:
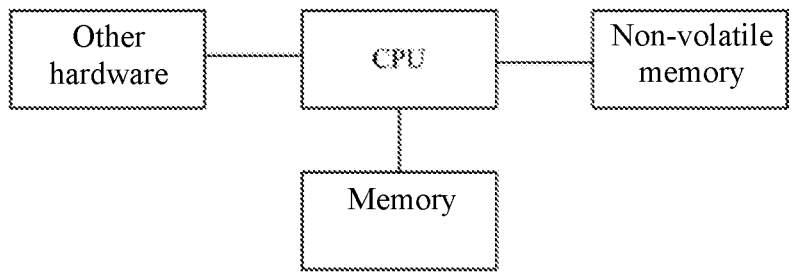
FIG. 5 is a hardware structural diagram of the device according to some embodiments.

Corresponding to the processes above, some embodiments further provide a device for writing data. The device can be implemented by software, hardware, or a combination of software and hardware. With software implementation as an example, the device in the sense of logic is formed by a CPU (Central Processing Unit) of an apparatus where the device is at reading corresponding computer program instructions into a memory for execution. From a hardware perspective, in addition to the CPU, memory and non-volatile memory shown in FIG. 5, the apparatus where the device for writing data is at typically further comprises other hardware like a chip for wireless signal receiving and transmission and/or other hardware like a board for achieving network communication functions.

Figure 6:
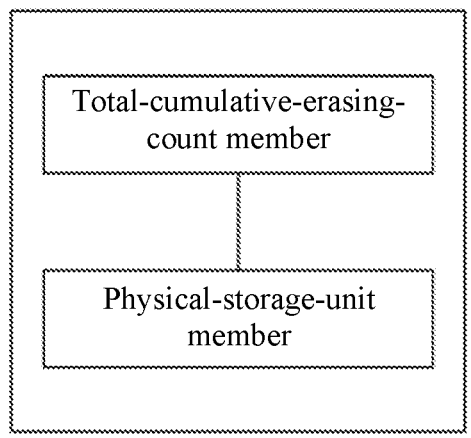
FIG. 6 is a logic structural diagram of a device for writing data according to some embodiments.

FIG. 6 illustrates a device for writing data according to some embodiments, the device being applied to a central control function module for performing writing control over at least two physical storage units, and the device comprising a total-cumulative-erasing-count member and a physical-storage-unit member, wherein the total-cumulative-erasing-count member is configured to obtain a total cumulative erasing count of all blocks in each physical storage unit; and the physical-storage-unit member is configured to write data into at least one physical storage unit having the lowest total cumulative erasing count among physical storage units satisfying a preset writing condition.

In some examples, the device further comprises a deviation-migration member configured to migrate, when a difference between total cumulative erasing counts of two physical storage units exceeds a preset deviation range, the data from one of the two physical storage units that has a higher total cumulative erasing count to the physical storage unit having a lower total cumulative erasing count.

In the examples, the preset deviation range can be determined based on an average of total cumulative erasing counts of all physical storage units.

Optionally, the data comprises: data to be written when migrating a file and/or data to be written when saving a file.

Optionally, the physical storage unit comprises a host machine; the central control function module comprises a cluster control module of a cluster comprising all host machines; and the total-cumulative-erasing-count member is configured to receive a total cumulative erasing count reported by each host machine at a preset period.

Optionally, the physical storage unit comprises a hard drive; the central control function module comprises a storage control module of a host machine; and the total-cumulative-erasing-count member is configured to read a total cumulative erasing count maintained in a superblock of each hard drive, the total cumulative erasing count being incremented by 1 after each block of the hard drive is allocated.

Figure 7:
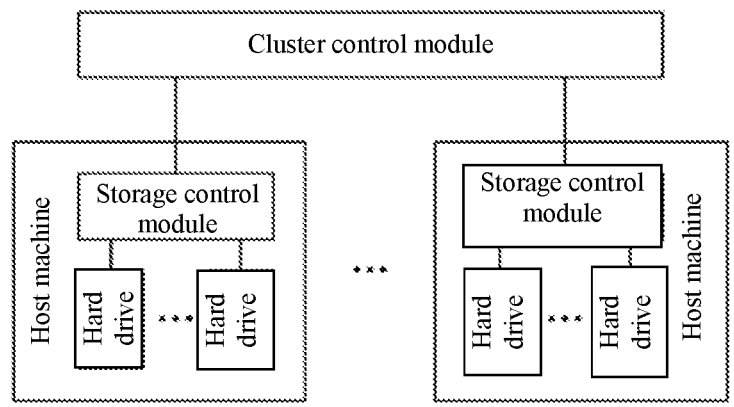
FIG. 7 is a logic structural diagram of a cluster according to some embodiments.

FIG. 7 illustrates a cluster according to some embodiments. The cluster comprises at least two host machines, and each host machine comprises at least two hard drives using flash memory as storage medium. The cluster further comprises a cluster control module and a storage control module on each host machine, wherein the cluster control module is configured to obtain a total cumulative erasing count of all blocks on each host machine, and when writing data is needed, select at least one host machine having the lowest host-machine total cumulative erasing count from host machines satisfying a preset host-machine writing condition as a target host machine; the storage control module on each host machine is configured to obtain a total cumulative erasing count of each hard drive on the host machine, and when the host machine is selected as a target host machine, write the data to at least one hard drive that satisfies a preset hard-drive writing condition and has the lowest hard-drive total cumulative erasing count.

Optionally, the cluster control module is further configured to migrate, when a difference between total cumulative erasing counts of two host machines exceeds a preset host-machine deviation range, the data from one of the two host machines that has a higher total cumulative erasing count to the host machine having a lower total cumulative erasing count; the storage control module on each host machine is further configured to migrate, when a difference between total cumulative erasing counts of two hard drives on a host machine exceeds a preset hard-drive deviation range, the data from one of the two hard drives that has a higher total cumulative erasing count to the hard drive having a lower total cumulative erasing count Optionally, the data comprises: data to be written when migrating a file.

Only preferred embodiments are described above, which are not used to limit the specification. Any modification, equivalent substitution or improvement made within the spirit and principle of the disclosure shall be encompassed by the protection scope of this application.

In a typical configuration, a computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EE-PROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions herein, the computer readable media do not include transitory media, such as modulated data signals and carriers.

The terms of "including", "comprising" or any other variants thereof intend to encompass a non-exclusive inclusion, so that a process, method, commodity or device comprising a series of elements not only comprises these elements, but also comprises other elements that are not specifically listed, or further comprises elements that are inherent to the process, method, commodity or device. When there is no further restriction, elements defined by the statement "comprising one . . . " do not exclude that a process, method, commodity or device comprising the above elements further comprises additional identical elements.

A person skilled in the art should understand that the embodiments may be provided as a method, a system, or a computer program product. Therefore, particular embodiments may be implemented as a complete hardware embodiment, a complete software embodiment, or an embodiment combing software and hardware. Moreover, particular embodiments may be in the form of a computer program product implemented on one or more computer usable storage media (including, but not limited to, a magnetic disk memory, CD-ROM, an optical memory, and the like) comprising computer usable program codes therein.

What is claimed is:

1. A method for writing data in a cluster of a plurality of host machines, each host machine comprising a plurality of hard drives, the method comprising:

obtaining a plurality of erasing counts for the hard drives on each host machine of the host machines, wherein the erasing count for each hard drive of the hard drives equals a total count of erasing operations that have been performed on the hard drive;

obtaining a total erasing count for each host machine of the host machines, wherein the total erasing count equals a sum of the erasing counts of the hard drives on the host machine;

determining whether a percentage of a difference between a maximum erasing count of the plurality of host machines and a minimum erasing count of the plurality of host machines during a monitoring time period to an average of the total erasing counts of all of the host machines exceeds a threshold percentage;

in response to determining that the percentage exceeds the threshold percentage, migrating data from a first host machine that has the maximum erasing count to a second host machine that has the minimum erasing count;

obtaining data to be written into the cluster;

in response to obtaining the data to be written into the cluster, identifying one or more of the host machines that each satisfy first conditions associated with writing the data, wherein the first conditions comprise:

that a remaining storage capacity of a host machine exceeds a threshold percentage of a total storage capacity of the host machine, that a number of accesses to data already stored on the host machine does not exceed an access threshold, and that the total erasing count of a host machine does not exceed a threshold value;

determining a host machine that has a smallest total erasing count among the identified one or more host machines;

identifying one or more hard drives on the determined host machine that each hard drive satisfies one or more second conditions associated with writing the data;

determining a hard drive that has the smallest erasing count among the identified one or more hard drives; and writing the data in the determined hard drive.

2. The method of claim 1, wherein the data comprises data to be written for file migration or file storage.

3. The method of claim 1, wherein:

the obtaining a total erasing count for each of the host machines comprises receiving a total erasing count reported by each of the host machines.

4. The method of claim 1, wherein:

the obtaining a plurality of erasing counts for the hard drives on each of the host machines comprises reading an erasing count maintained in a superblock of each of the hard drives.

5. The method of claim 4, wherein the erasing count maintained in the superblock of each hard drive is incremented by one each time a block of the hard drive is allocated for an erasing operation.

6. The method of claim 1, wherein the first conditions further comprise: that a host machine does not store the data to be written into the cluster.

7. A system for writing data in a cluster of a plurality of host machines, each host machine comprising a plurality of hard drives, comprising a processor and a non-transitory computer-readable storage medium storing instructions executable by the processor to cause the system to perform operations comprising:

obtaining a plurality of erasing counts for the hard drives on each host machine of the host machines, wherein the erasing count for each hard drive of the hard drives equals a total count of erasing operations that have been performed on the hard drive;

obtaining a total erasing count for each host machine of the host machines, wherein the total erasing count equals a sum of the erasing counts of each of the hard drives on the host machine;

determining whether a percentage of a difference between a maximum erasing count of the plurality of host machines and a minimum erasing count of the plurality of host machines during a monitoring time period to an average of the total erasing counts of all of the host machines exceeds a threshold percentage;

in response to determining that the percentage exceeds the threshold percentage, migrating data from a first host machine that has the maximum erasing count to a second host machine that has the minimum erasing count obtaining data to be written into the cluster;

in response to obtaining the data to be written into the cluster, identifying one or more of the host machines that each satisfy first conditions associated with writing the data, wherein the first conditions comprise:

that a remaining storage capacity of a host machine exceeds a threshold percentage of a total storage capacity of the host machine, that a number of accesses to data already stored on the host machine does not exceed an access threshold, and that the total erasing count of a host machine does not exceed a threshold value;

determining a host machine that has a smallest total erasing count among the identified one or more host machines;

identifying one or more hard drives on the determined host machine that each hard drive satisfies one or more second conditions associated with writing the data;

determining a hard drive that has the smallest erasing count among the identified one or more hard drives; and writing the data in the determined hard drive.

8. The system of claim 7, wherein the data comprises data to be written for file migration or file storage.

9. The system of claim 7, wherein:
the obtaining a total erasing count for each of the host machines comprises receiving a total erasing count reported by each of the host machines.

10. The system of claim 7, wherein:
the obtaining a plurality of erasing counts for the hard drives on each of the host machines comprises reading an erasing count maintained in a superblock of each of the hard drives.

11. The system of claim 10, wherein the erasing count maintained in the superblock of each hard drive is incremented by one each time a block of the hard drive is allocated for an erasing operation.

12. The system of claim 7, wherein the first conditions further comprise: that a host machine does not store the data to be written into the cluster.

13. A non-transitory computer-readable storage medium for writing data in a cluster of a plurality of host machines, each host machine comprising a plurality of hard drives, the non-transitory computer-readable storage medium being configured with instructions executable by one or more processors to cause the one or more processors to perform operations comprising:

obtaining a plurality of erasing counts for the hard drives on each host machine of the host machines, wherein the erasing count for each hard drive of the hard drives equals a total count of erasing operations that have been performed on the hard drive;

obtaining a total erasing count for each host machine of the host machines, wherein the total erasing count equals a sum of the erasing counts of each of the hard drives on the host machine;

determining whether a percentage of a difference between a maximum erasing count of the plurality of host machines and a minimum erasing count of the plurality of host machines during a monitoring time period to an average of the total erasing counts of all of the host machines exceeds a threshold percentage;

in response to determining that the percentage exceeds the threshold percentage, migrating data from a first host machine that has the maximum erasing count to a second host machine that has the minimum erasing count obtaining data to be written into the cluster;

in response to obtaining the data to be written into the cluster, identifying one or more of the host machines that each satisfy first conditions associated with writing the data, wherein the first conditions comprise:

that a remaining storage capacity of a host machine exceeds a threshold percentage of a total storage capacity of the host machine, that a number of accesses to data already stored on the host machine does not exceed an access threshold, and that the total erasing count of a host machine does not exceed a threshold value;

determining a host machine that has a smallest total erasing count among the identified one or more host machines;

identifying one or more hard drives on the determined host machine that each hard drive satisfies one or more second conditions associated with writing the data;

determining a hard drive that has the smallest erasing count among the identified one or more hard drives; and writing the data in the determined hard drive.

14. The non-transitory computer-readable storage medium of claim 13, wherein the data comprises data to be written for file migration or file storage.

15. The non-transitory computer-readable storage medium of claim 13, wherein:
the obtaining a total erasing count for each of the host machines comprises receiving a total erasing count reported by each of the host machines.

16. The non-transitory computer-readable storage medium of claim 13, wherein:
the obtaining a plurality of erasing counts for the hard drives on each of the host machines comprises reading an erasing count maintained in a superblock of each of the hard drives.

17. The non-transitory computer-readable storage medium of claim 16, wherein the erasing count maintained in the superblock of each hard drive is incremented by one each time a block of the hard drive is allocated for an erasing operation.

18. The non-transitory computer-readable storage medium of claim 13, wherein the first conditions further comprise: that a host machine does not store the data to be written into the cluster.

* * * * *